United States Patent [19]

Tada

[11] Patent Number: 4,517,317

[45] Date of Patent: May 14, 1985

[54] POLYMER COMPOSITION

[75] Inventor: Seiichi Tada, Ichihara, Japan

[73] Assignee: Du Pont-Mitsui Polychemicals Co., Ltd., Tokyo, Japan

[21] Appl. No.: 631,835

[22] Filed: Jul. 17, 1984

[30] Foreign Application Priority Data

| Jul. 22, 1983 | [JP] | Japan | 58-133940 |
| Jul. 22, 1983 | [JP] | Japan | 58-133941 |
| Nov. 8, 1983 | [JP] | Japan | 58-209537 |

[51] Int. Cl.$^3$ .............................. C08J 9/10
[52] U.S. Cl. ................................ 521/95; 521/135;
521/189; 525/189; 525/190; 525/449; 525/451;
528/392
[58] Field of Search ............... 521/95, 135, 189;
525/189, 190, 449, 451; 528/392

[56] References Cited

U.S. PATENT DOCUMENTS

| 3,657,202 | 4/1972 | Hammer et al. | 525/189 |
| 3,684,778 | 8/1972 | Hammer | 525/189 |
| 3,780,140 | 12/1973 | Hammer | 260/884 |
| 4,275,181 | 6/1981 | Hoh | 525/189 |
| 4,370,423 | 1/1983 | Rys-Sikora | 521/189 |
| 4,391,922 | 7/1983 | Harrell | 521/189 |
| 4,391,923 | 7/1983 | Rys-Sikora | 521/189 |
| 4,394,459 | 7/1983 | Rys-Sikora | 521/84 |
| 4,434,253 | 2/1984 | Rys-Sikora | 521/189 |

*Primary Examiner*—Morton Foelak
*Attorney, Agent, or Firm*—Wenderoth, Lind & Ponack

[57] ABSTRACT

A polymer composition comprising an ethylene-vinyl acetate-carbon monoxide copolymer and a nitrogen-containing or an alicyclic epoxy compound, and a foamable polymer composition comprising an ethylene-vinyl acetate-carbon monoxide copolymer, a heat-decomposable organic blowing agent having a decomposition temperature of at least 90° C., and a nitrogen-containing or an alicyclic epoxy compound.

13 Claims, No Drawings

POLYMER COMPOSITION

This invention relates to a polymer composition. More specifically, it relates to a composition containing an ethylene-vinyl acetate-carbon monoxide copolymer as a base and having improved processability and heat stability and reduced odor.

Generally, ethylenic polymers are nonpolar and have the defect of poor compatibility with other polymers. An ethylene-vinyl acetate-carbon monoxide copolymer, however, has good compatibility with many polymers containing polar groups such as polyvinyl chloride, polyamides and cellulose derivatives because it has highly polar carbon monoxide units in the molecule (see, for example, U.S. Pat. No. 3,780,140).

In particular, the ethylene-vinyl acetate-carbon monoxide copolymer (to be sometimes abbreviated as "EVACO copolymer" hereinafter) is used as a permanent plasticizer instead of conventional liquid plasticizers or as a modifier. The use of the EVACO copolymer as a permanent plasticizer makes most of its characteristics, and can circumvent the changes with time of the rigidity of vinyl chloride resin compositions owing to volatilization or extraction of the liquid plasticizers, and the contamination of substrates by bleed-out of the liquid plasticizers from such vinyl chloride resin compositions, which are the defects of the conventional vinyl chloride resin compositions. Sheets and other articles fabricated from vinyl chloride resin compositions containing the EVACO copolymer are also used in fields where conventional vinyl chloride resin compositions cannot be satisfactorily applied, for example as pond liners for reservoirs of industrial waste water which require outdoor durability, and cover sheets of electrical appliances which require a high degree of freedom from bleed-out.

The EVACO copolymer or blends of this polymer with other synthetic resins such as vinyl chloride resins, however, have relatively poor heat stability at high temperatures during kneading or molding or during a crosslinking reaction with organic peroxides or by electron beam irradiation, and this causes the final products to have an irritating odor. This defect is commonly possessed by vinyl acetate-type polymers. Since vinyl acetate units in the EVACO copolymer are adjacent to carbon monoxide units, the reactivity of the vinyl acetate units is high, and they tend to liberate acetic acid at lower temperatures, and in turn impart an irritating odor to the final products. It is generally known that such a defect is removed by adding magnesium oxide to the EVACO copolymer or a polymer composition containing it (see, for example, RESEARCH DISCLOSURE 1973 (18), page 50).

The addition of magnesium oxide is effective for preventing the occurrence of an irritating odor in the products. But during processing, the EVACO copolymer or its composition has poor releasability from the roll surface or has reduced heat stability. For example, a test of heating at 120° C. for 400 hours which is used to evaluate the heat stability of a vehicle sheet, etc. the heat weight loss of a sheet of the EVACO copolymer or its composition containing magnesium oxide has an increased heat ignition loss and its discoloration is accelerated. In particular, the poor releasability from the roll surface is serious. Since this defect prevents smooth performance of the processing operation, it constitute a serious drawback in the kneading and molding process.

Because the aforesaid problems are detrimental to the practical application of the EVACO copolymer or a blend of it with another synthetic polymer, it has been strongly desired to improve the processability, odor and heat stability of the EVACO polymer.

The present inventor has made extensive investigations in order to solve these technical problems, and has now found a polymer composition prepared by blending a certain specific kind of epoxy compound with an EVACO copolymer or a polymer composition containing the copolymer, and have succeeded in solving the problems of the processability, odor and heat stability of the EVACO copolymer.

Thus, according to this invention, there is provided a polymer composition comprising an ethylene-vinyl acetate-carbon monoxide copolymer (EVACO copolymer) and a nitrogen-containing or an alicyclic epoxy compound.

The EVACO copolymer used in the polymer composition of this invention is known, and consists of, based on the weight of the copolymer, about 40 to about 80%, preferably about 50 to about 75%, and more preferably about 60 to about 70%, of ethylene, about 15 to about 60%, preferably about 17 to about 50%, more preferably about 20 to about 35%, of vinyl acetate, and about 5 to about 30%, preferably about 5 to about 20%, more preferably about 5 to about 15%, of carbon monoxide, and may contain, as required, up to about 20%, preferably up to about 10% by weight, of units of another copolymerizable monomer, for example units of at least one monomer selected from the group consisting of unsaturated mono- and di-carboxylic acids having 3 to 20 carbon atoms, esters of the mono- and di-carboxylic acids, vinyl esters of saturated carboxylic acids in which the acid groups have 3 to 18 carbon atoms, vinyl alkyl ethers in which the alkyl group has 1 to 18 carbon atoms, acrylonitrile, methacrylonitrile, copolymerizable unsaturated hydrocarbons, for example alphaolefins having 3 to 12 carbon atoms, and ring compounds such as norbornene and vinyl aromatic compounds. The EVACO copolymer can be prepared, for example in accordance with the method of U.S. Pat. No. 3,780,140, by copolymerizing ethylene, vinyl acetate and carbon monoxide and as required, the other monomer in the presence of a radical polymerization catalyst.

The EVACO copolymer may be a solid polymer having a melt index (determined in accordance with ASTM D-1238 (condition E)) of generally from 0.1 to 1,000, preferably from 1 to 100.

According to this invention, a nitrogen-containing or an alicyclic epoxy compound is incorporated in the EVACO copolymer.

The "nitrogen-containing epoxy compound", as used herein, denotes the reaction product of a polyamine and epichlorohydrin. Specifically, it includes mono- or diglycidylamino group-containing epoxy compounds such as triglycidyl isocyanurate, tetraglycidyl meta-xylylenediamine, tetraglycidyl diamino diphenylmethane, diglycidylaniline, and p-(glycidylamino)phenol glycidyl ether.

The "alicyclic epoxy compound" denotes the reaction products of an alicyclic diene compound and a peracid such as peracetic acid, and specific examples include vinyl dicyclohexene diepoxide, and 3,4-epoxycyclohexylmethyl(3,4-epoxycyclohexane)carboxylate.

These epoxy compounds may be used singly or in combination. The nitrogen-containing epoxy compounds, particularly those containing a mono- or diglycidylamino group, are preferred. Triglycidyl isocyanurate is most suitable.

The amount of the epoxy compound to be incorporated can be varied widely according to the types of the EVACO copolymer and the epoxy compound. Generally, it is about 0.1 to about 20 parts by weight, preferably about 0.5 to about 5 parts by weight, more preferably 1 to 2 parts by weight, per 100 parts by weight of the EVACO copolymer. If the epoxy compound is used in a smaller proportion, the desired effect of preventing the occurrence of an irritating odor cannot be obtained. If it is larger than the specified limit, the melt viscosity of the polymer composition decreases during the melt-kneading and the composition becomes sticky and has reduced moldability.

If epoxy compounds other than the nitrogen-containing and alicyclic epoxy compounds, for example glycidyl ether-type epoxy compounds such as bisphenol A diglycidyl ether, glycidyl ester-type epoxy compounds such as diglycidyl phthalate, and straight-chain aliphatic epoxy compounds such as epoxidized soybean oil, are used, the effect of removing the irritating odor is insufficient, and the object of this invention cannot be achieved. Such other epoxy compounds, however, may be used in combination with the nitrogen-containing or alicyclic epoxy compounsds.

The copolymer composition can be composed substantially of the EVACO copolymer and the specific epoxy compound described above. If desired, it may further comprise at least one organic polymer having compatibility. As described in U.S. Pat. No. 3,780,140, it is frequently the practice to improve the properties of at least one other organic polymer having compatibility, for example polyamides, polymers derived from cellulose, vinyl halide polymers, vinylidene halide polymers, polymers based on alpha-olefins, styrene polymers, acrylonitrile polymers, polyesters, polyurethanes, polycarbonate, acrylic polymers, natural rubbers, and synthetic rubbers, by blending such with the EVACO copolymer. Particularly, the EVACO copolymer is very important commercially as a permanent plasticizer for vinyl chloride polymers.

The effect of adding the specific epoxy compound in accordance with the present invention is attained similarly with blends of the EVACO copolymer and other organic polymers. Vinyl chloride polymers are preferred as the other organic polymers. The "vinyl chloride polymers" that can be included in the polymer composition of this invention include homopolymers of vinyl chloride and copolymers of a major proportion (at least 50%, preferably at least 80% by weight) of vinyl chloride and at least one other comonomer, for example alpha-olefins such as ethylene, propylene and 1-butene; vinyl esters such as vinyl acetate; unsaturated carboxylic acid esters such as alkyl acrylates and alkyl methacrylates; vinyl ethers such as alkyl vinyl ethers; vinyl halides such as vinyl bromide and vinyl fluoride; other vinyl compounds such as styrene and acrylonitrile; and vinylidene compounds such as vinylidene chloride. As required, ordinary liquid plasticizers (in an amount of up to 500 parts by weight per 100 parts by weight of the EVACO copolymer) may be incorporated in these vinyl chloride polymers. These vinyl chloride polymers may have an average degree of polymerization, $\overline{P}n$, defined by JIS K6721, of 500 to 5,000.

The amount of the vinyl chloride polymer to be incorporated can be varied widely according to the properties required of the final product and the types of the EVACO polymer and the vinyl chloride polymer. Generally, it is 30 to 1,000 parts by weight, preferably 70 to 300 parts by weight, per 100 parts by weight of the EVACO copolymer.

Other organic polymers which can be included in the polymer composition of this invention include polyamides; polymers derived from cellulose, such as cellulose acetate, cellulose propionate, cellulose butyrate, regenerated cellulose and nitrocellulose; vinylidene halide polymers, such as polyvinylidene fluoride and a copolymer of vinylidene chloride and vinyl chloride; polymers based on alpha-olefins having 2 to 12 carbon atoms, such as polyethylene, polypropylene, chlorosulfonated polyethylene, chlorinated polyethylene, and other halogenated polyolefins, ionomers (ethylene/methacrylic acid copolymer neutralized with alkali metal hydrides), ethylene/vinyl ester copolymers (namely, vinyl esters of saturated carboxylic acids, such as vinyl acetate, vinyl propionate, vinyl butyrate, and vinyl stearate), and hydrolyzed polymers derived therefrom (ethylene/vinyl alcohol), and styrene polymers such as styrene/methacrylic acid copolymer and styrene/acrylonitrile copolymer; polymers of acrylonitrile, such as polyacrylonitrile, and copolymers of at least 40% of acrylonitrile with another ethylenically unsaturated comonomer such as vinyl acetate, vinyl chloride, ethylene and isobutylene; acrylic polymers, such as alkyl esters of ethylenically unsaturated carboxylic acids, such as alkyl acrylates and alkyl methacrylates with the alkyl group having 1 to 18 carbon atoms; polyesters such as polyethylene terephthalate and poly-1,4-cyclohexenedimethylene terephthalate; polyurethane; polycarbonate; natural rubbers and synthetic rubbers such as styrene-butadiene rubber.

As required, antioxidants, ultraviolet absorbers, plasticizers, pigments, fillers (such as calcium carbonae, silica and talc), antiblocking agents, lubricants, etc. may be added to the polymer composition of this invention.

The polymer composition is prepared by dry-blending or melt-blending the aforesaid ingredients either simultaneously or successively. In the case of dry-blending, the specific epoxy compound can easily be melt-mixed uniformly when the EVACO copolymer with or without the other organic polymer is melted and plasticized. In the case of melt-blending, the above ingredients are mixed in the molten state by using various mixers, rollers or kneaders such as a single-screw extruder, a twin-screw extruder or a Banbury mixer. There is no particular restriction on the sequence of mixing these ingredients.

The polymer composition of this invention can be crosslinked by treatment with an organic peroxide or by irradiation of electron beams, and thus its mechanical properties at high temperatures and its antiblocking properties can be improved.

The polymer composition of this invention prepared by adding the specific epoxy compound to the EVACO copolymer with or without the other organic polymer brings about the following advantages.

(1) The EVACO polymer composition prepared by adding magnesium oxide has poor releasability from the roll surface during the kneading and molding. In contrast, the polymer composition of this invention exhibits good releasability from the roll surface and good processability.

(2) The irritating odor of molded articles, such as films or sheets, from the EVACO copolymer or a blend of it with another organic polymer, described above, is due presumably to acetic acid which is generated by the heat decomposition of the vinyl acetate units of the EVACO copolymer when it is heated at high temperatures, for instance during kneading or molding. It is believed that in the polymer composition of this invention, acetic acid is captured as acetic acid ester by the ring-opening reaction of the specific epoxy compound, and therefore, the final product does not have an irritating odor ascribable to acetic acid.

(3) As stated hereinabove, the EVACO copolymer composition containing magnesium oxide gives a product having much reduced aging resistance, and the product undergoes accelerated discoloration and has a high weight loss. In contrast, the inclusion of the specific epoxy compound in the polymer composition of this invention serves to obviate the reduction of the aging resistance of the product.

Thus, the polymer composition of this invention shows improved releasability, processability, heat resistance and aging resistance and the prevention of an irritating odor. These advantages are very noteworthy.

The polymer composition of this invention improves vinyl chloride resins plasticized with liquid plasticizers or synthetic rubbers softened with liquid softening agents in regard to bleed out, oil resistance and volatilization, and is useful as interior trimming materials for automobiles, roofing materials, and wire and cable insulations.

The polymer composition of this invention can be used in the form of a solid, and can also be used in the form of a foamable composition containing a certain blowing agent.

Thus, according to another aspect of this invention, there is provided a foamable polymer composition comprising an ethylene/vinyl acetate/carbon monoxide copolymer (EVACO copolymer), a heat-decomposable organic blowing agent having a decomposition temperature of at least 90° C., and a nitrogen-containing or an alicyclic epoxy compound.

Foams produced from polyolefins as raw materials and heat-decomposable organic blowing agents are of two types, non-crosslinked and crosslinked, both of which are manufactured on a commercial scale. The moldability and properties of foams of this type are greatly dependent upon the properties of the starting resins. Actually, high-pressure low-density polyethylene and a copolymer of ethylene and vinyl acetate are now widely used as the starting resins. On the other hand, active research work has been undertaken for new starting resins which would give foams of improved properties with improved moldability to meet the needs of the market.

The present inventor has now found that when the EVACO copolymer or a mixture of it with another organic polymer, particularly a vinyl chloride polymer, is used as a starting resin for foams, there can be obtained a foamed product having very satisfactory physical properties with very satisfactory moldability (for example, a foamed product having dense and uniform cells can be obtained at a high expansion ratio). On the other hand, it has been found that when a very ordinary heat-decomposable blowing agent such as azodicarbonamide is used, the resulting foamed product is colored brown, and furthermore, since intramolecular crosslinking proceeds rapidly and the melt viscosity of the resin increases, the molding conditions become difficult to control.

In order to produce an excellent foamed product from the EVACO copolymer as a starting resin, it is first necessary to overcome such a defect. The inventor first tried to ascertain the cause of such a defect, and found that various gases generated by the decomposition of the blowing agent, especially ammonia gas, react with the EVACO copolymer to crosslink it and colors the foamed product. Further investigations have led to the discovery that the addition of the aforesaid specified epoxy compound to the EVACO copolymer or a blend of it with the other organic polymer is very effective for preventing such reaction, and can give a foamed product free from coloration without a substantial increase in melt viscosity.

The foamable polymer composition of this invention achieves a particularly great advantage when a heat-decomposable organic blowing agent which evolves ammonia gas is used. At times, the foamable, polymer composition of this invention may be used with another type of heat-decomposable blowing agent or a combination of the ammonia-yielding blowing agent and the other type of blowing agent.

The blowing agent that can be used in the foamable polymer composition of this invention is a heat-decomposable organic blowing agent having a decomposition temperature of at least 90° C., preferably 95° to 250° C., more preferably 150° to 220° C. Typical examples include mono- and polyazoformamide compounds such as azodicarbonamide; sulfonyl hydrazide compounds such as p-toluenesulfonyl hydrazide and p,p'-hydroxybis(-benzenesulfonyl hydrazide); sulfonyl semicarbazide compounds such as p-toluenesulfonyl semicarbazide; and dinitrosomethyleneamine compounds such as N,N'-dinitropentamethylenetetramine. These blowing agents may be used singly or in combination. Azodicarbonamide is most suitable. These blowing agents may be used together with other blowing agents such as azobisisobutyronitrile, N,N'-dinitropentamethylenetetramine and 4,4'-hydroxybenzenesulfonyl hydrazide.

The amount of the blowing agent is not critical, and can be widely varied depending upon the expansion ratio required of the final product, the type of the blowing agent, etc. Generally, it is 0.5 to 20 parts by weight, preferably 1 to 10 parts by weight, per 100 parts by weight of the polymer.

As required, the foamable polymer composition may further include a suitable amount (usually 1 to 100 parts by weight per 100 parts by weight of the blowing agent) of blowing aids such as zinc stearate, zinc oxide, urea and diethylene glycol.

The foamable polymer composition of this invention can be produced by dry-blending the EVACO copolymer, another organic polymer as an optional component, the epoxy compound and a blowing agent and other optional additives either simultaneously or in any desired sequence, and kneading them uniformly by using a kneading machine such as a roll, a Banbury mixer or an extruder.

The foamable polymer composition so prepared may be foamed without crosslinking, or crosslinked and foamed. Foaming may be performed by a method known per se. In the case of foaming without crosslinking, a non-crosslinked foam can be obtained by, for example, melting the foamable polymer composition in a non-vent type extruder, and extrusion-molding the molten composition (for example, forming it into an blown film) or injection-molding it at a temperature above the decomposition temperature of the blowing agent.

Foaming with crosslinking can be carried out by applying ionizing radiation or by using a chemical crosslinking agent. For example, the crosslinking and foaming by applying ionizing radiation can be carried out by forming a substantially non-foamed article in a suitable shape such as a sheet from the foamable polymer composition by such means as injection molding, calendering and extrusion, and applying ionizing radiation, for example, electron beams, beta-rays and gamma-rays, to the article, and heating the article to a temperature above the decomposition temperature of the blowing agent. The dose of the electron beams can be varied depending upon the degree of crosslinking required in the final product. Generally, it is in the range of 1 to 20 Mrads.

The foaming by using a chemical crosslinking agent can be carried out by incorporating the chemical crosslinking agent in advance in the foamable polymer composition. Those chemical crosslinking agents which generate radicals by being decomposed at a temperature lower than the decomposition temperature of the blowing agent used and induce the crosslinking reaction of the polymer and preferably have a decomposition temperature of at least about 120° C. Organic peroxides are generally used as such a chemical crosslinking agent. Specific examples include dicumyl peroxide, 2,5-dimethyl-2,5-bis-tert-butylperoxyhexane, 2,5-dimethyl-2,5-bis-tert-butylperoxyhexyne-3 and 1,3-bis(tert-butylperoxyisopropyl)benzene. The amount of the chemical crosslinking agent used is not critical, and can be varied depending upon the degree of crosslinking required of the final product, the type of the chemical crosslinking agent, etc. The suitable amount of the chemical crosslinking agent is generally 0.2 to 5 parts by weight, preferably 0.5 to 3 parts by weight, per 100 parts by weight of the polymer. As required, the composition may further include up to 10 parts by weight, per 100 parts by weight, of an ultraviolet sensitizer such as benzophenone and a crosslinking accelerator such as divinylbenzene, diallylbenzene, divinylnaphthalene, divinylbiphenyl, divinylcarbazole, triallyl cyanurate and triallyl phosphate.

By heating the foamable polymer composition containing a chemical crosslinking agent and crosslinking it simultaneously or prior to foaming, in accordance with ordinary methods, a crosslinked foamed product can be obtained.

Preferably, for practical purposes, the foamable polymer composition provided by this invention contains the aforesaid vinyl chloride polymer in addition to the EVACO copolymer. The suitable amount of the vinyl chloride polymer is generally 30 to 500 parts by weight, preferably 50 to 200 parts by weight, per 100 parts by weight of the EVACO copolymer.

When a foamed product is produced from the foamable polymer composition of this invention, ammonia gas formed by the decomposition of the blowing agent is effectively captured by the specified epoxy compound, and the undesirable side-reaction between the EVACO copolymer and ammonia is inhibited. As a result, the following effects can be obtained.

(1) A foamed product having a reduced degree of coloration can be produced. The foamed product is prevented from being colored brown, and foamed products of pale color can be produced.

(2) Foamed products having a high expansion ratio can be produced. When the epoxy compound is not used, the EVACO copolymer is crosslinked by the action of ammonia present in the decomposition gases from a large amount of the blowing agent, and its melt viscosity increases, leading to the inability to give foamed products of a high expansion ratio. In contrast, the foamable polymer composition of this invention does not induce crosslinkage other than by a chemical crosslinking agent. Accordingly, by using a large amount of the blowing agent, foamed articles having an expansion ratio of about 30 to about 40 can be produced.

(3) The kinds of blowing agents that can be used increase. When the epoxy compound is not used, the blowing agent is limited to those which do not generate ammonia gas in order to avoid coloration. In accordance with this invention, however, blowing agents which evolve ammonia gas upon decomposition can also be used.

(4) Foamed products can be produced commercially and stably. When the epoxy compound is not used, the crosslinking product of the EVACO copolymer with ammonia stays like a sticky secretion of the eyes at the die exit or included in a sheet during foaming without crosslinking or radiation-initiated crosslinking and foaming, or in the case of producing sheets by the extrusion molding method. This prevents stable production of sheets. Since this problem can be solved by the present invention, stable production of the sheets becomes possible. In the case of crosslinking and foaming using a chemical crosslinking agent, the crosslinking reaction of the EVACO copolymer with ammonia in which the degree of crosslinking is greatly affected by the temperature conditions can be inhibited, and therefore, it is very easy to control the expansion ratio, the molding cycle, etc.

From the foamable polymer composition of this invention, there can be produced with good moldability various foamed articles of good properties such as sandal soles, intermediate pads of sport shoes, shopping bags, interior trimming materials of automobiles, building materials, furniture, heat insulating covers and cushioning materials.

The following examples illustrate the present invention. All parts in these examples are by weight.

EXAMPLES 1 TO 6

In each run, a polymer composition having the following formulation was prepared and moled into a sheet. The properties of the composition and the sheet were evaluated in accordance with the methods shown below.

| | |
|---|---|
| Polyvinyl chloride (average degree of polymerization 1000) | 100 parts |
| EVACO copolymer (vinyl acetate 24%, CO 10%, MI 35 dg/min.) | 100 |
| Ba-Zn stabilizer | 2.5 parts |
| Phosphite ester | 0.5 |
| Epoxidized soybean oil | 5 |
| Phenolic antioxidant | 0.3 |
| Specific epoxy compound | Amount indicated in Table 1 |

Methods of Measurement and Evaluation

Roll releasability: The composition was kneaded at 165° C. on a 6-inch roll, and the time which elapsed until the kneaded mixture could no longer be removed from the roll surface was measured.

Irritating odor: Five grams of the sheet was sealed up in a 200 ml glass bottle, and heated at 100° C. for 4 hours. The bottle was then opened, and the presence of an irritating odor was examined.

Discoloration ($\Delta E$): The sheet was heated to 120° C. for 1 week, and the degree of its discoloration was examined by using a color difference meter (Color Computer Model SM-2 made by Suga Testing Machine Co., Ltd.).

Heat ignition loss: The sheet was heated at 120° C. for 400 hours, and then the change of the weight of the sheet was examined.

COMPARATIVE EXAMPLE 1

The procedure of Examples 1 to 6 was repeated except that the epoxy compounds were not used.

COMPARATIVE EXAMPLE 2

The procedure of Examples 1 to 6 was repeated except that 1 part by weight of magnesium oxide was used instead of the epoxy compounds.

COMPARATIVE EXAMPLE 3

The procedure of Examples 1 to 6 was repeated except that 5 parts by weight of bisphenol A gidlycidyl ether (EPOMIK R-301, a trade name for a product of Mitsui Petrochemical Industries, Ltd.) was used instead of the specified epoxy compound.

Table 1 below show the results of measurements and evaluations obtained in Examples 1 to 6 and Comparative Examples 1 to 3.

roll sheet. The sheet was heated at 230° C. for 10 minutes. The surface color and the gel fraction (the proportion of an insoluble portion determined when the sheet was immersed for 24 hours in xylene at 110° C.) were determined. The results are shown in Table 2.

TABLE 2

| No. | Amount (parts) of triglycidyl isocyanurate | Color of the surface | Gel fraction (%) |
| --- | --- | --- | --- |
| 1 | 0 | Light brown | 69 |
| 2 | 0.5 | Yellow | 20 |
| 3 | 1.0 | Yellow | 0 |
| 4 | 2.0 | Yellow | 0 |

EXAMPLE 8

Example 7, No. 4 was repeated except that the same amount of each of the various epoxy compounds shown in Table 3 was used instead of triglycidyl isocyanurate. The surface colors and the gel fractions of the foamed sheets are shown in Table 3.

TABLE 3

| No. | Epoxy compound | Color of the surface | Gel fraction (%) |
| --- | --- | --- | --- |
| 1 | Tetraglycidyl m-xylylene-diamine (PGA-X, a product of Mitsubishi Gas Chemical Co., Inc.) | Yellow | 0 |
| 2 | Tetraglycidyl diaminodiphenylmethane (Sumitomo ELM-434, a product of Sumitomo Chemical Co., Ltd.) | Yellowish green | 0 |
| 3 | 3,4-Epoxycyclohexylmethyl (3,4-epoxycyclohexane)-carboxylate (ARALDITE CY-179, a product of Ciba-Geigy) | Pale brown | 38 |

TABLE 1

| Example (Ex.) or Comparative Example (CEx.) | Epoxy compound Name | Amount (parts) | Roll releasability (minutes) | Irritating odor | Discoloration ($\Delta E$) | Heat ignition loss (%) |
| --- | --- | --- | --- | --- | --- | --- |
| Ex. 1 | Triglycidyl isocyanurate (EPIKOTE RXE-15, a product of Shell Chemical Co.) | 0.3 | 60 | Slight | 28 | 3.6 |
| Ex. 2 | Triglycidyl isocyanurate (EPIKOTE RXE-15, a product of Shell Chemical Co.) | 1.0 | 60 | None | 30 | 3.6 |
| Ex. 3 | Triglycidyl isocyanurate (EPIKOTE RXE-15, a product of Shell Chemical Co.) | 2.0 | 50 | None | 32 | 3.5 |
| Ex. 4 | Triglycidyl isocyanurate (EPIKOTE RXE-15, a product of Shell Chemical Co.) | 5.0 | 30 | None | 40 | 3.8 |
| Ex. 5 | Tetraglycidyl m-xylylene-diamine (PGX-A, a product of Mitsubishi Gas Chemical Co.) | 1.0 | 40 | None | 35 | 3.3 |
| Ex. 6 | 3,4-Epoxycyclohexylmethyl-(3,4-epoxycyclohexane)-carboxylate (ARALDITE CY-179, a tradename for a product of Ciba-Geigy) | 1.0 | 50 | None | 28 | 3.8 |
| CEx. 1 | (None) | — | 60 | Occurred | 26 | 3.5 |
| CEx. 2 | (MgO) | 1.0 | 15 | None | 63 | 5.1 |
| CEx. 3 | bis-Phenol A diglycidyl ether | 5.0 | 50 | Occurred | 30 | 3.7 |

EXAMPLE 7

In each run, 100 parts of an ethylene-vinyl acetate-carbon monoxide copolymer (vinyl acetate content 26% by weight, carbon monoxide 3% by weight, melt index 20 dg/min.), 5 parts of azodicarbonamide and a predetermined amount of triglycidyl isocyanurate (EPIKOTE RXE-15) were mixed and molded into a

EXAMPLE 9

| | |
|---|---|
| EVACO copolymer (vinyl acetate 26%, CO 3%, MI 35 dg/min.) | 100 parts |
| Dicumyl peroxide | 0.6 |
| Azodicarbonamide | 4 |
| Zinc stearate | 4 |
| Calcium carbonate | 30 |
| Triglycidyl isocyanurate (EPIKOTE RXE-15) | Amount indicated in Table 4 |

The above ingredients were kneaded by a roll, and press-formed at 160° C. for 12 minutes. The surface colors and expansion ratios of the resulting crosslinked foamed products are shown in Table 4.

TABLE 4

| No. | Triglycidyl isocyanurate (parts) | Color of the surface | Expansion ratio (*) |
|---|---|---|---|
| 1 | 0 | Brown | 3.2 |
| 2 | 1.0 | Brown | 4.0 |
| 3 | 2.0 | Light brown | 5.1 |
| 4 | 4.0 | Light yellow | 5.3 |

(*) The "expansion ratio" is the ratio of the density of the foamed product to that of the composition before foaming which is determined in accordance with JIS K-6767.

EXAMPLE 10

| | |
|---|---|
| EVACO copolymer (vinyl acetate 24%, CO 10%, MI 35 dg/min.) | 50 parts |
| Ethylene-vinyl acetate copolymer (vinyl acetate 14%, MI 3.5) | 50 |
| Azodicarbonamide/N,N'—dinitrosopentamethylenetetramine mixture (VINYFOR AK#2, a tradename for a product of Eiwa Chemical Co., Ltd.) | 7 |
| Dicumyl peroxide | 0.8 |
| Calcium carbonate | 20 |
| Stearic acid | 1 |
| Tetraglycidyl m-xylylenediamine (POA-X, a product of Mitsubishi Gas Chemical Co., Inc.) | Amount indicated in Table 5 |

The above ingredients were kneaded by a roll, and press-formed at 160° C. for 12 minutes. The surface colors, the expansion ratios and the hardnesses (ASKER-C) of the crosslinked foamed products are shown in Table 5.

TABLE 5

| No. | Tetraglycidyl m-xylylenediamine (parts) | Color of the surface | Expansion ratio (*) | Hardness |
|---|---|---|---|---|
| 1 | 0 | Dark brown | 7.2 | 41 |
| 2 | 1.0 | Brown | 7.9 | 35 |
| 3 | 2.0 | Light brown | 8.4 | 31 |
| 4 | 4.0 | Light yellow | 8.7 | 30 |

Note: Cracks occurred in the crosslinked foamed product of Run No. 1.

EXAMPLE 11

| | |
|---|---|
| EVACO copolymer (vinyl acetate 24%, CO 10%, MI 35 dg/min.) | 30 parts |
| Ethylene-vinyl acetate copolymer (vinyl acetate 14%, MI 25) | 70 |
| Azodicarbonamide | 0.8 |
| Zinc stearate | 0.5 |
| Titanium oxide | 2 |
| Triglycidyl isocyanurate (EPIKOTE RXE-15) | Amount indicated in Table 6 |

A composition composed of the above ingredients was molded into an inflation film by an inflation film molding device having a diameter of 50 mm under the following conditions.

Barrel temperature prescribed: 160° C.
Die temperature prescribed: 140° C.
Screw rotating speed: 60 rpm
Amount of extrusion: 30 kg/hour The surface colors and expansion ratios of the resulting foamed films are shown in Table 6.

TABLE 6

| No. | Triglycidyl isocyanurate (parts) | Color of the surface | Expansion ratio (*) |
|---|---|---|---|
| 1 | 0 | Light brown | 2.0 |
| 2 | 2.0 | White | 2.1 |

EXAMPLE 12

| | |
|---|---|
| Vinyl chloride resin (average degree of polymerization 1100) | 100 parts |
| EVACO copolymer (vinyl acetate 26%, CO 3%, MI 35 dg/min.) | 50 |
| Dioctyl phthalate | 50 |
| Ba-Zn Ba—Zn | 3 |
| Azodicarbonamide | 4 |
| Stearic acid | 0.5 |
| Titanium oxide | 3 |
| Triglycidyl isocyanurate (EPIKOTE RXE-15, a product of Shell Chemical Co.) | Amount indicated in Table 7 |

The above ingredients were kneaded by a roll, and the resulting roll sheet was backed with a cotton cloth. The resulting sheet was heated in a heating oven at 220° C. for 5 minutes. The colors and expansion ratios of the resulting foamed products and the heat stability of the foamable resin composition (the color after heating at 220° C. for 10 minutes) are shown in Table 7. The expansion ratio was the ratio of the thickness of the foamed sheet foaming to that of the non-foamed sheet.

TABLE 7

| No. | Triglycidyl isocyanurate (parts) | Color of the surface | Expansion ratio (*) | Heat stability |
|---|---|---|---|---|
| 1 | 0 | Brown | 4.8 | Black |
| 2 | 1.0 | Light brown | 5.3 | Brown |
| 3 | 2.0 | Light brown | 5.6 | Light brown |
| 4 | 5.0 | White | 5.8 | Pale brown |

EXAMPLE 13

Example 12, No. 4 was repeated except that 3,4-epoxycyclohexylmethyl (3,4-epoxycyclohxane)carboxylate was used instead of triglycidyl cyanurate. The resulting foamed product had a light brown color and an expansion ratio of 5.2. The heat stability of the foamable resin composition was brown.

COMPARATIVE EXAMPLES 4 AND 5

Example 12, No. 4 was carried out except that bisphenol A glycidyl ether or epoxidized soybean oil was used instead of triglycidyl isocyanurate. The resulting foamed products had a brown color, and an expansion ratio of 5.0. The heat stability of each of the foamable resin compositions was black.

EXAMPLE 14

| | |
|---|---|
| Vinyl chloride resin (average degree of polymerization 1100) | 100 parts |
| EVACO copolymer (same as in Example 11) | 35 |
| Dioctyl phthalate | 60 |
| Ba—Zn stabilizer | 3 |
| Azodicarbonamide | 1 |
| Stearic acid | 0.1 |
| Calcium carbonate | 5 |
| Titanium oxide | 5 |
| Tetraglycidyl m-xylylenediamine (PGA-X, a product of Mitsubishi Gas Chemical Co., Inc.) | 2 |

The above ingredients were kneaded and pelletized by a twin-screw extruder with two screws having a diameter of 30 cm rotating in the same direction under the following conditions.

Die temperature prescribed: 150° C.
Screw rotating speed: 150 rpm
Amount of extrusion: 10 kg/hour The pellets were injection-molded by an in-line screw injection-molding machine under the following conditions.

Nozzle temperature: 180° C.
Injection pressure: 70 kg/cm$^2$
Injection time: 15 seconds A foamed product (density 0.72 g/cm$^3$) having a surface skin layer with a thickness of 2 mm and containing white uniform cells was obtained.

COMPARATIVE EXAMPLE 6

Example 14 was repeated except that 5 parts of epoxidized soybean oil was used instead of tetraglycidyl m-xylylenediamine. The resulting foamed product (density 0.75 g/cm$^3$) was colored brown.

What is claimed is:

1. A foamable polymer composition comprising an ethylene-vinyl acetate-carbon monoxide copolymer, a heat-decomposable organic blowing agent having a decomposition temperature of at least 90° C., and an epoxy compound selected from the group consisting of a nitrogen-containing epoxy compound and an alicyclic epoxy compound.

2. The polymer composition of claim 1 wherein the epoxy compound is an epoxy compound containing a mono- or di-glycidylamino group.

3. The polymer composition of claim 1 wherein the epoxy compound is triglycidyl isocyanurate.

4. The polymer composition of claim 1 wherein the amount of the epoxy compound is 0.5 to 5 parts by weight per 100 parts by weight of the copolymer.

5. The polymer composition of claim 1 wherein the amount of the epoxy compound is 1 to 2 parts by weight per 100 parts by weight of the copolymer.

6. The polymer composition of claim 1 wherein the heat-decomposable organic blowing agent is selected from the group consisting of mono- and polyazoformamide compounds, sulfonyl hydrazide compounds, sulfonyl semicarbazide compounds and dinitrosomethyleneamine compounds.

7. The polymer composition of claim 1 wherein the heat-decomposable organic blowing agent is azodicarbonamide.

8. The polymer composition of claim 1 which is crosslinked.

9. The polymer composition of claim 8 whose crosslinking is carried out by application of ionizing radiation.

10. The polymer composition of claim 8 which further comprises a chemical crosslinking agent.

11. The polymer composition of claim 1 which further comprises another organic polymer having compatibility with said copolymer.

12. The polymer composition of claim 11 wherein the other organic polymer is a vinyl chloride polymer.

13. The polymer composition of claim 12 wherein the amount of the vinyl chloride-type polymer is 30 to 500 parts by weight per 100 parts by weight of said copolymer.

* * * * *

UNITED STATES PATENT AND TRADEMARK OFFICE
CERTIFICATE OF CORRECTION

PATENT NO. : 4,517,317

DATED : May 14, 1985

INVENTOR(S) : Seiichi Tada

It is certified that error appears in the above-identified patent and that said Letters Patent is hereby corrected as shown below:

Column 2, line 64, change "dicyclohexene" to --cyclohexene--;

Column 6, line 35, change "dinitropentamethylene-tetramine" to --dinitrosopentamethylenetetramine--;

line 39, change "dinitropentamethylene-tetramine" to --dinitrosopentamethylenetetramine--.

Signed and Sealed this

Twenty-sixth Day of November 1985

[SEAL]

Attest:

DONALD J. QUIGG

Attesting Officer

Commissioner of Patents and Trademarks